United States Patent [19]

Kipphan

[11] Patent Number: 4,963,029

[45] Date of Patent: Oct. 16, 1990

[54] REGISTER-MEASURING SYSTEM

[75] Inventor: Helmut Kipphan, Schwetzingen, Fed. Rep. of Germany

[73] Assignee: Heidelberger Druckmaschinen AG, Heidelberg, Fed. Rep. of Germany

[21] Appl. No.: 206,206

[22] Filed: Jun. 13, 1988

[30] Foreign Application Priority Data

Jun. 13, 1987 [DE] Fed. Rep. of Germany ....... 3719766

[51] Int. Cl.[5] .............................................. G01B 11/00

[52] U.S. Cl. ...................................... 356/401; 356/399

[58] Field of Search ................................ 356/398–401, 356/375; 101/485, 486, 484

[56] References Cited

U.S. PATENT DOCUMENTS

| | | | |
|---|---|---|---|
| 3,944,739 | 3/1976 | Sword et al. | 358/225 |
| 4,054,390 | 10/1977 | Rabl | 250/574 |
| 4,553,478 | 11/1985 | Greiner et al. | 101/484 |
| 4,615,621 | 10/1986 | Allen et al. | 356/399 |
| 4,671,663 | 6/1987 | Sick | 356/431 |
| 4,679,071 | 7/1987 | Kitagawa | 356/401 |
| 4,694,749 | 9/1987 | Takeuchi et al. | 101/492 |

FOREIGN PATENT DOCUMENTS

| | | |
|---|---|---|
| 0133120 | 2/1985 | European Pat. Off. . |
| 2940233 | 4/1981 | Fed. Rep. of Germany . |
| 3226078 | 10/1984 | Fed. Rep. of Germany . |
| 3248795 | 4/1985 | Fed. Rep. of Germany . |
| 3614578 | 11/1987 | Fed. Rep. of Germany . |

*Primary Examiner*—David C. Nelms
*Assistant Examiner*—Hoa Pham
*Attorney, Agent, or Firm*—Herbert L. Lerner; Laurence A. Greenberg

[57] ABSTRACT

A device for determining a register error in the case of a multi-color print made with a printing press includes a handheld housing containing a sight formed in a bottom surface of the housing; an optical system disposed at a distance from the sight and having an optical axis directed towards the sight; a mirror disposed between the optical system and the for deflecting light reflected from within the sight; a light-receiving unit disposed so as to be irradiated with the light deflected by the mirror; and an evaluation unit connected to the light-receiving unit for evaluating information from the light received by the light-receiving unit; a register mark to be measured by the device; and a method of operating the device.

23 Claims, 7 Drawing Sheets

IX a
IX b
IX c
IX d
4
25
28
29
33
34
35
36
37
38
B

REGISTER-MEASURING SYSTEM

BACKGROUND OF THE INVENTION

1. Field of the Invention:

The invention relates to a register-measuring system and, more particularly, to such a system which is of the type used in offset printing for checking the position of the printing plates.

In multi-color printing, several printing plates are required for the different color separations. Particular importance is attached in this regard to the position of the individual printing plates; in particular, the relative positions of the individual printing plates with regard to circumferential and side register, respectively, are of great importance for the quality of the printed product. Incorrect positioning of the printing plates leads to a reduction in quality. In general, therefore, efforts are in progress to create means by which it is possible to provide precise position-determination and, as a consequence thereof, precise positioning of the printing plates. In order to facilitate the positioning of the individual printing plates for the various color separations, use is made at present of, for example, cross-shaped register marks, so-called register crosses, on the individual printing plates. These register crosses are usually in the non-printed area of the printed sheet, for example, in the region of the edges or corners of the sheet. By means of these register crosses an adjustment of the position of the plates is possible, a relative superimposition of the individual register crosses being assessed or detected.

If the register crosses of the individual printing plates are not exactly superimposed relative to one another, the degree of deviation is usually established by an inspection on the part of the observer. Adjustment is then made to the printing plate in question and is repeated until the register crosses of all of the colors are exactly superimposed.

A disadvantage thereof is the time-consuming process of adjustment owing to the fact that the very thin lines (approx. 0.1 mm) are difficult to see, even when examined with a magnifying glass, and the estimation of the dimensional deviations in relation to one another (which is necessary within the range of 0.01 mm) is difficult and imprecise, so that the duration of the adjustment process depends upon the eyesight, skill and experience of the machine operator. Efforts are therefore also in progress to replace visual examination by an automatic reading device which determines the positions of register marks provided for this purpose.

Yet, even with an automatic reading device, great importance is attached to the formation of the register mark, because the reliability with which the reading device recognizes the register mark depends decisively on how the register mark is embodied or shaped.

2. Description of the Related Act

Automatic register-measuring systems operating on a photoelectric basis have become known heretofore from German Patent Nos. 32 48 795 and 32 26 078. These systems are on-line systems that perform measurements of the register marks during the production process.

The state of the art likewise includes television cameras that communicate with on-line and off-line systems and which scan and transmit register marks. This method, however, has the disadvantage that these systems are too complex and therefore too expensive. Moreover, the measuring systems belonging to the state of the art are predominantly of the stationary type and are difficult to install flexibly, respectively.

SUMMARY OF THE INVENTION

It is accordingly an object of the invention to provide a register-measuring system which utilizes a measuring device of hand-held construction and in which it is possible to dispense with automatic color recognition. Furthermore, the measuring system should be able to compensate automatically for incorrect positioning of the measuring device.

With the foregoing and other objects in view, there is provided, in accordance with a first aspect of the invention, a device for determining a register error in the case of a multi-color print made with a printing press, comprising a hand-held housing containing a sight formed in a bottom surface of the housing; an optical system disposed at a distance from the sight and having an optical axis directed towards the sight; a mirror disposed between the optical system and the sight for deflecting light reflected from within the sight; a light-receiving unit disposed on the optical axis and behind the optical system so as to be irradiated with the light deflected by the mirror; and an evaluation unit connected to the light-receiving unit for evaluating information from the light received by the light-receiving unit.

In accordance with another feature of the invention, a device for screening out incident unwanted light is provided between the optical system and the mirror.

In accordance with an added feature of the invention, there is provided another optical system disposed in an optical path of the light between the mirror and the light-receiving unit.

In accordance with an additional feature of the invention, the other optical system comprises a magnifier, and a filter is disposed in the optical path of the light between the mirror and the magnifier.

In accordance with a further feature of the invention, the sight has a basic geometry corresponding approximately to geometrical dimensions of a register mark and is formed with further slit-shaped recesses along respective straight lines of the register cross, the sight being formed with a bevel at one edge thereof.

In accordance with again another feature of the invention, there is provided a device, wherein the light-receiving unit comprises two rows of diodes positioned transversely to one another, relative positions of the rows of diodes corresponding to relative positions of information carriers contained on a register mark.

In accordance with again an additional feature of the invention, illuminating means are disposed above the sight for illuminating the sight.

In accordance with again an added feature of the invention, there is provided a keyboard for supplying information other than from the light to the evaluation unit.

In accordance with again a further mode of the invention, there is provided a photo diode in the housing for measuring the light reflected from the register mark and from the paper within the sight.

In accordance with still another feature of the invention, there are provided cylindrical lenses disposed in front of the light-receiving unit.

In accordance with still an additional feature of the invention, there are provided cylindrical lenses disposed in front of the rows of diodes.

In accordance with still a further feature of the invention, there is provided a glass filter disc disposed between the sight and the mirror.

In accordance with still an added feature of the invention, the light-receiving unit comprises two rows of diodes disposed transversely to one another and being rotatable relative to the angular alignment thereof.

In accordance with still another feature of the invention, there are provided means for determining and displaying an optimum datum color.

In accordance with another aspect of the invention, there is provided a register mark for automatically measuring and visually assessing register errors in products formed by printing presses, comprising a register cross formed of two intersecting vertical and horizontal straight lines extending at right angles to one another; a circle having a center point at a point of intersection of the straight lines of the register cross; a first sequence of lines extending parallel to the vertical straight lines of the register cross, the lines of the first sequence of lines being perpendicular to the vertical straight line, and a second sequence of lines extending parallel to the horizontal straight line of the register cross, the lines of the second sequence of lines being perpendicular to the horizontal straight line, one line of the respective first and second sequence of lines being a reference line from which the other lines of the first and second sequence of lines, respectively, are at a determinable distance, the other lines of the first and second sequence of lines, respectively, representing a given color separation.

In accordance with another mode of the invention, each color separation is provided with a register cross, the straight lines of the register cross being formed with interruptions differing from that for every other color separation.

In accordance with an additional mode of the invention, each color separation has a line belonging to the first and second sequence of lines, respectively, and being at a distance from the reference line differing from the distance therefrom of the lines of the other color separations.

In accordance with an added mode of the invention, the distance between the lines of the respective first and second sequence of lines is greater than twice that of a maximum anticipated register error.

In accordance with a further aspect of the invention, there is provided a method of recognizing a first form and perfector side of a sheet when measuring a register error with a register-error measuring device, which comprises providing a register mark containing a code for first form or perfector sides, reading the code with the device and simultaneously interpreting the code automatically.

In accordance with yet another mode of the invention, there is provided a method which comprises inputting a command for the first form or perfector sides prior to performing the measurement.

In accordance with yet an additional mode of the invention, there is provided a method which comprises basically setting the device for first form or perfector printing, and inputting a command, if necessary, for changing the basic setting for a following measurement.

In accordance with yet a further mode of the invention, there is provided a method which comprises, prior to a printing job, inputting a command for informing the device of the colors occurring on either the first form and perfector sides.

In accordance with a concomitant mode of the invention, there is provided a method which comprises providing each register mark with an item of information (code) by means of which the position of the register mark is identifiable.

Other features which are considered as characteristic for the invention are set forth in the appended claims.

Although the invention is illustrated and described herein as embodied in a register-measuring system, it is nevertheless not intended to be limited to the details shown, since various modifications and structural changes may be made therein without departing from the spirit of the invention and within the scope and range of equivalents of the claims.

BRIEF DESCRIPTION OF THE DRAWING

The construction and method of operation of the invention, however, together with additional objects and advantages thereof will be best understood from the following description of specific embodiments when read in connection with the accompanying drawings, in which.

DESCRIPTION OF THE PREFERRED EMBODIMENT

Figure 1:
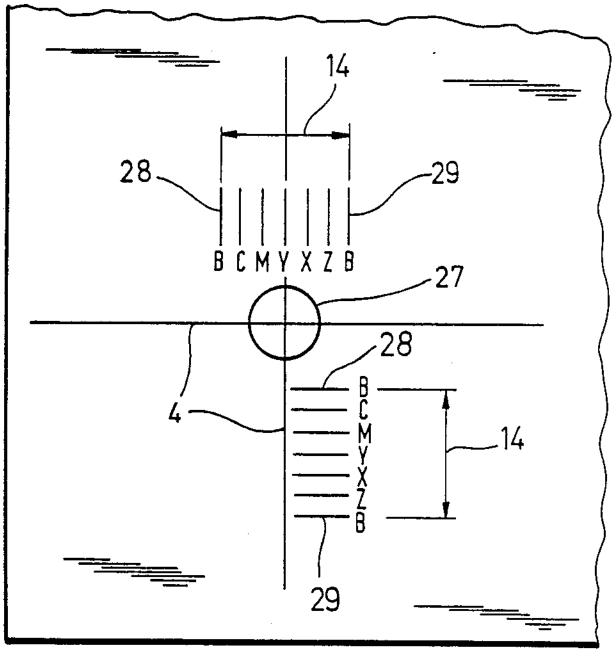
FIG. 1 is a fragmentary plan view of a printing plate showing a register mark.
Figure 2:
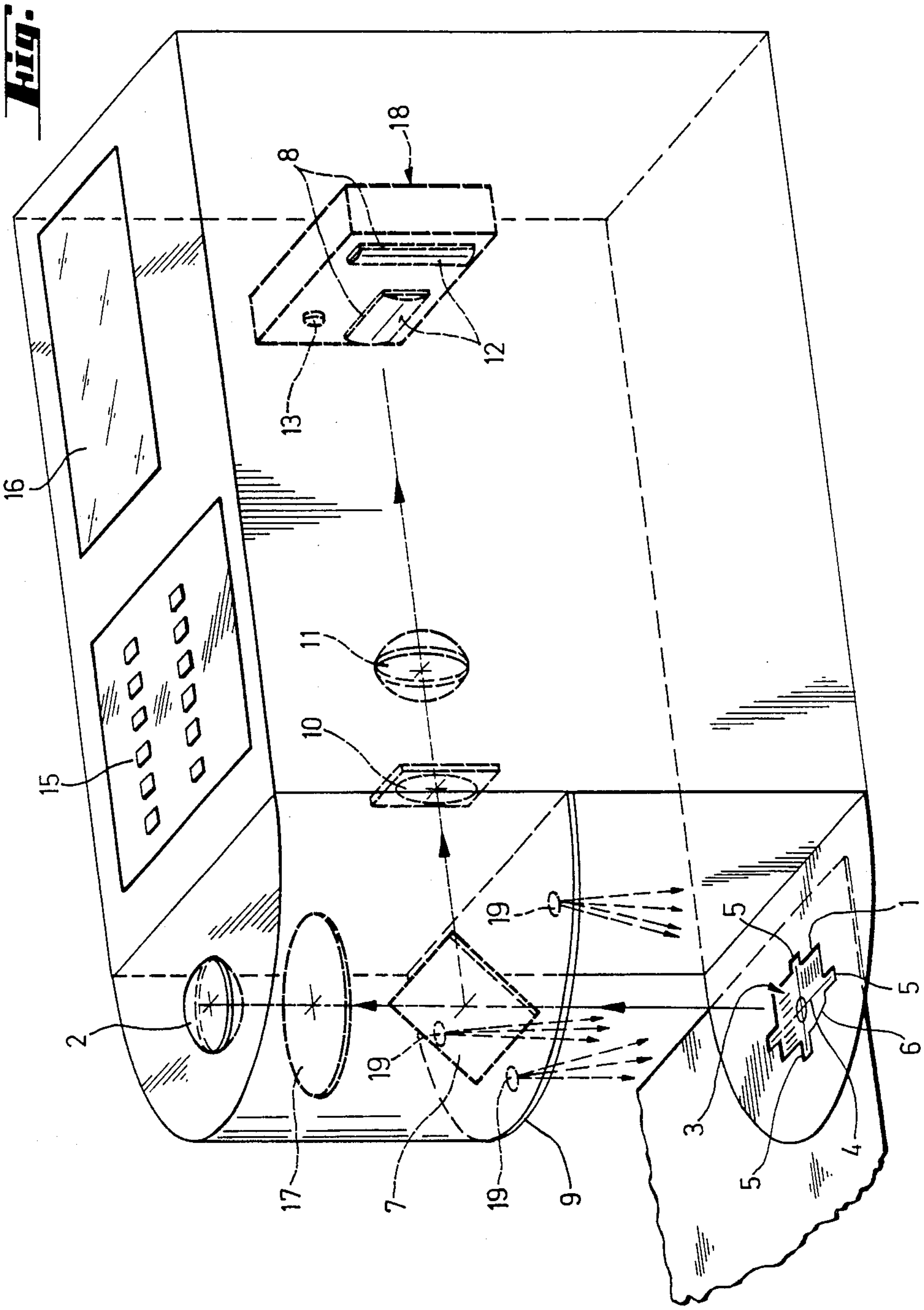
FIG. 2 is a diagrammatic perspective view of an embodiment of a device incorporating the register-measuring system according to the invention.

Referring now to the drawing and, first, particularly to FIG. 2 thereof, there is shown therein a register-measuring device according to the invention, in the form of a separately operating hand-held unit, all components of which are accommodated in a housing shown only diagrammatically or in outline in the figure. The outer construction of the device is largely the same as that of a hand-held densitometer. It is obvious, of course, that other outer constructions are also possible.

Furthermore, the device is also suitable for connection to a motor-driven register-control system of the printing press.

The device contains a sight 1 formed in the base thereof and a magnifier such as a magnifying lens 2, through which it is possible to observe the register marks 3 situated within the sight 1. It is surely self-evident, in this connection, that the magnifier 2 may also be replaced by other optical means serving the same purpose. The sight 1 is approximately equivalent to or slightly greater than the geometrical dimensions of the register mark being measured. In the embodiment illustrated in FIG. 2, the sight 1 has a basic rectangular shape one edge of which is formed with a bevel 6. In addition, the straight edges or lines forming the basic rectangular shape of the sight 1 are each formed in the middle thereof, at right angles thereto, with a recess constituting a slit 5.

The measuring device is constructed so that it has to be positioned in a way that crosses 4 of the register mark lie within the slits 5, thereby ensuring that the complete register mark 3 is located within the measuring area.

The bevel 6 at the one edge or corner of the sight 1 permits a facilitated and correct positioning of the device. It also provides, in particular, effective protection against unintentional turning of the device through an angle of 180 degrees, so that errors of alignment of this kind are largely eliminated. For better visibility and measurability, the register mark 3 may be additionally illuminated by one or more lamps 19.

The register mark 3 is measured by a swivel-mounted or flap-type semi-reflective mirror 7 as in the illustrated embodiment. Of course, the mirror 7 may also be replaced by other means serving the same purpose. The light reflected by the register mark 3 is deflected by the mirror 7 towards rows of diodes 8, an image of the register-mark lines or bars being formed on the rows of diodes 8 via an optical system 11. During the measuring process, it is possible for incident and possibly unwanted light coming in through the magnifier 2 to be blocked out or screened by either a mechanically positioned shutter or mirror, instead of the semi-reflective mirror 7. The same effect is attainable by an optoelectronically controlled window 17, which blocks out light coming in through the magnifier 2 during the measurement process, a fact which advantageously means that no moving parts are required.

Before the light is deflected at the mirror 7, infra-red (IR) filtering occurs at the glass filter disc 9. After the light is deflected at the mirror 7, further filtering by an optimal color filter 10 such as a blue filter, occurs. The optimal color filter 10 effects a modification of the lines so that the lines of all of the colors possess sufficient contrast with respect to the background and can therefore be measured with approximately equal resolution by the two rows of diodes disposed perpendicularly to one another in accordance with the register mark. The optical system magnifier 11 provided between the optimal color filter 10 and the light-receiving unit 18 permits the formation of an enlarged image of the register mark 3 in the plane of the diode rows 8. The diode rows 8 are provided with cylindrical lenses 12. The provision of the cylindrical lenses 12 at the rows of diodes 8 advantageously means that the (sharp) image is maintained transversely to the lines of the register mark 3, but is changed in longitudinal direction in a manner that averaging occurs over a very large area (e.g. 2 mm). Consequently, in an advantageous manner, the line edges, relatively heavily textured by the printing process, especially by the surface of the paper, and thus the line widths, which fluctuate in their fine structure, are averaged and reproducibly measured.

Figure 3:
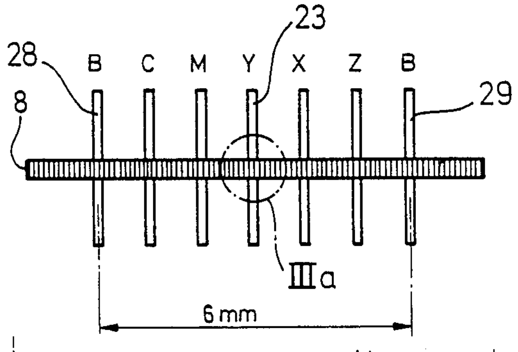
FIG. 3 is a diagrammatic view of a bar or line sequence of the register mark with a row of diodes.
Figure 3A:
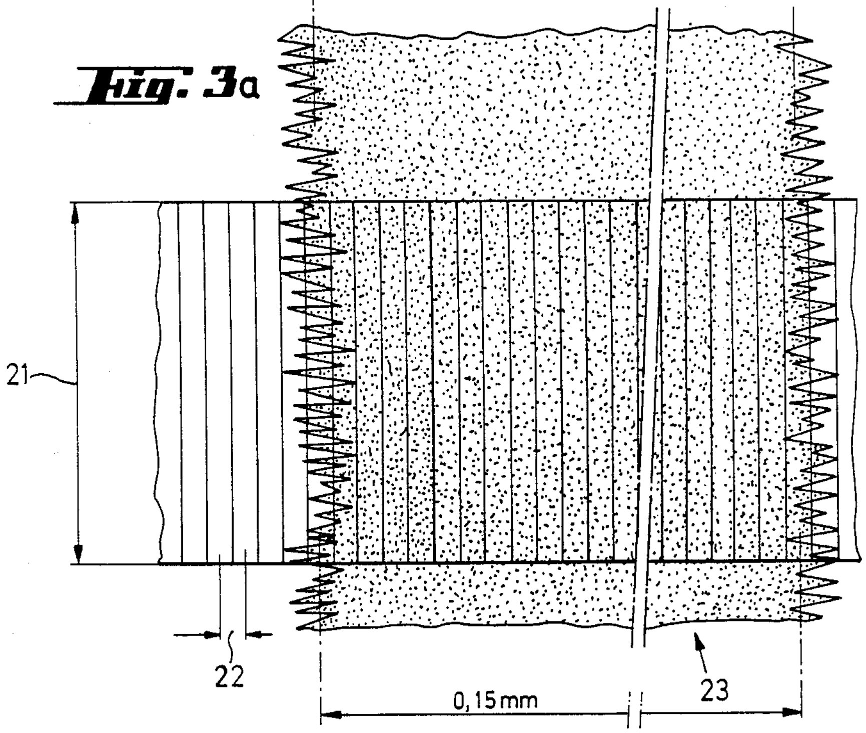
FIG. 3*a* is an enlarged fragmentary view of FIG. 3.
Figure 4:
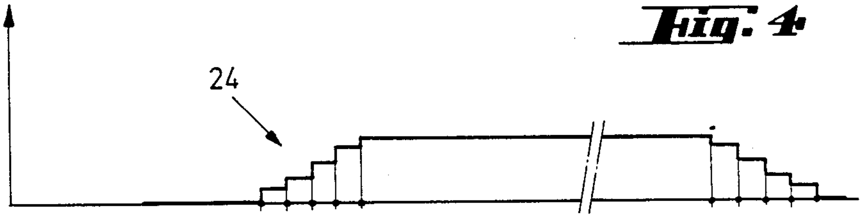
FIG. 4 is a plot diagram of the intensity extending across the row of diodes.

The formation of an overall image of a line 23 on one of the diode rows 8 is shown diagrammatically in FIG. 3a. FIG. 4 shows the course of intensity across the diode rows 8.

In addition to the measuring process, the photodiode 13 mounted in the vicinity of the diode rows 8 determine all of the light reflected by paper and register mark 3, thereby permitting control of the exposure time of the diode rows 8 as a function of the light intensity and the condition of the electronics.

The measured signal is evaluated in a non-illustrated conventional electronic evaluation unit in such a manner that, initially, the positions of the line edges are determined and, from them, the positions of the lines are determined (line centers). Because the distance or spacing 14 between the two outermost B-lines 28, 29 is fixed (e.g. 6 mm), it is thus possible to determine the spacing of all of the lines in relation, for example, to the first line in 1/100 mm i.e. hundredths of a millimeter, in fact, irrespective of whether the unit is placed in position at an angle to the register mark, as long as all lines are within the measuring area.

If register marks 3 are to be measured in which the distance between the outermost reference lines 28, 29 is of an amount different from the base amount (e.g. 6 mm), then the unit must be calibrated to this in a special measuring mode. Automatic calibration is conditional upon a base calibration of the unit, by which the correlation between the light-receiving unit 18 and the geometrical distance between lines on the sheets has been made. This base calibration is performed with a special calibration mark with absolutely fixed, known distances or spacings between the lines.

Figure 5:
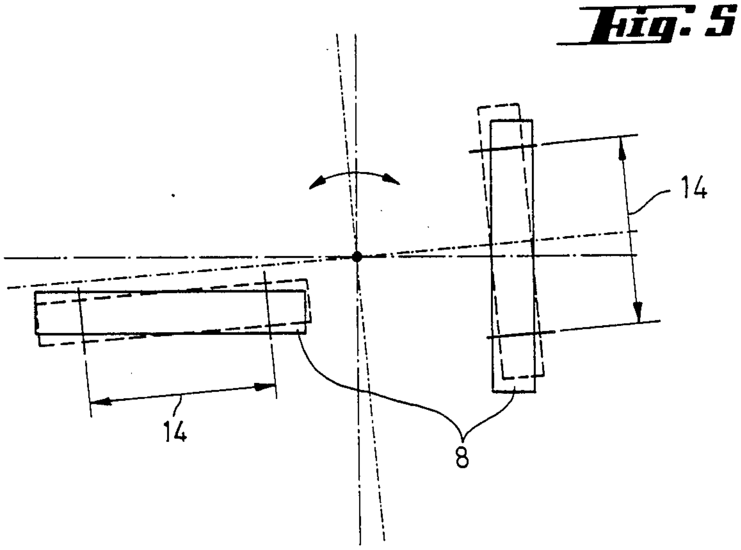
FIG. 5 is a diagrammatic view of the measuring device shown at an angular position with respect to the register mark.

The angular-alignment tolerance for the positioning of the unit on the register mark 3 can be considerably increased in a further embodiment if, for example, a specific angular range is scanned internally by turning the diode rows 8. The thus determined minimum distance or spacing between the basic lines is adopted as a reference dimension (FIG. 5).

By comparison with the specified nominal positions of the lines in relation to the B-lines (e.g. 1 mm), it is then possible to determine the register error of each individual color, for example C, M, Y (C=Cyan, M=Magenta, Y=Yellow) in relation to B (B=Black) as the datum color. It is also possible to select and to specify any other color as the datum color. The register errors of the other colors are thus determined in relation to this color.

Furthermore, the device is able, in accordance with given criteria, automatically to determine and display the optimum datum color and, if necessary or desirable, to use it in communication with the printing press. The criteria that may be used as a decision-making basis are, for example, the smallest number of the printing units which are necessarily to be adjusted, the smallest amount of adjustment of all printing units, and so forth or combinations of such individual criteria.

Instead of the fixed prescribed nominal positions of the individual lines, the device is also able to adopt other positions deviating therefrom as nominal positions. This may be done, for example, from a printing proof or after a fine manual correction to an OK sheet. The positions of the register marks 3 on the sheets can be fed to the device through a keyboard 15 or by means of a simultaneously measured coding of the register mark 3. From this, it is possible to determine an average or mean register error of the individual colors of several register marks 3, the average register error indicating what adjustment of the registers will result in an averaging-out of the register errors of the selected register marks 3.

The device is checked with the aid of a specified "standard register mark".

Likewise, it is possible to determine differences in register error between any two register marks 3, the differences being a measure of the skew and/or distortion or tensioning of the plate and being able to be used for correction of the errors. Because the device is suitable also for simultaneous first form and perfector printing, there are various possibilities for associating the measured values of the register marks measured on each sheet side with the respective side.

(a) The register mark 3 is provided with a code, which is read simultaneously with the performance of the measurement.

(b) Furthermore, there is the possibility, prior to each measurement, of inputting a command as to whether the first form or perfected side is to be measured.

(c) Moreover, it is possible, prior to a new job, to inform the device by means of a command input as to which colors occur on the perfected side (or first form side).

(d) With regard to the mounting of the register marks 3, it is prescribed that, with a total of six possible colors, for example, only those color separations of register mark 3 not occurring on the first form side are to be used for the perfected side. Furthermore, the portion of the register mark 3 provided for B must also be printed on the perfected side in one of the perfected colors, either in addition to the portion of the register mark 3 corresponding to the color or instead of this portion. It is then possible for the device automatically to associate each measurement either with the first form side or with the perfected side and to output corresponding adjustment recommendations.

The adjustment recommendations computed by the device are indicated directly on the display 16 of the device and can be printed by a printer connected thereto. They can also be transmitted, however, directly to the control desk of the printing press and for energization of the motors for circumferential and side register, respectively, and can be used for direct adjustment and control of the registers, respectively.

In principle, the use of the register-cross reader is possible also for in-line measurement i.e. for measurement inside the press, for example, on the last impression cylinder or, in the case of first form and perfector printing, additionally on the last impression cylinder before turning of the sheet, assuming appropriate triggering and optimization of the measuring time.

The register mark 3 used in the specimen embodiment has the following advantageous features:

The register mark can be automatically measured with a register-cross reader as well as visually assessed. It is suitable for several colors, the register-cross reader not requiring any technically elaborate color recognition facility; this means that measurement without color recognition is also possible. Furthermore, the defined spacing between the lines (e.g. 6 mm between the first and last lines) permits measurement at relative distances and automatic compensation for any possible inclined alignment of the device, respectively, as well as compensation for the condition of the optoelectronic components.

For example, due to the provision of a code, it is possible, for effecting an automatic evaluation, to determine the position of each individual register cross 4 both with regard to first form and perfector printing and also with regard to the position on the sheets.

For approximately 7×17 mm, the space required is very small, the 7 mm transverse to the running direction being of particular significance.

Figure 6:
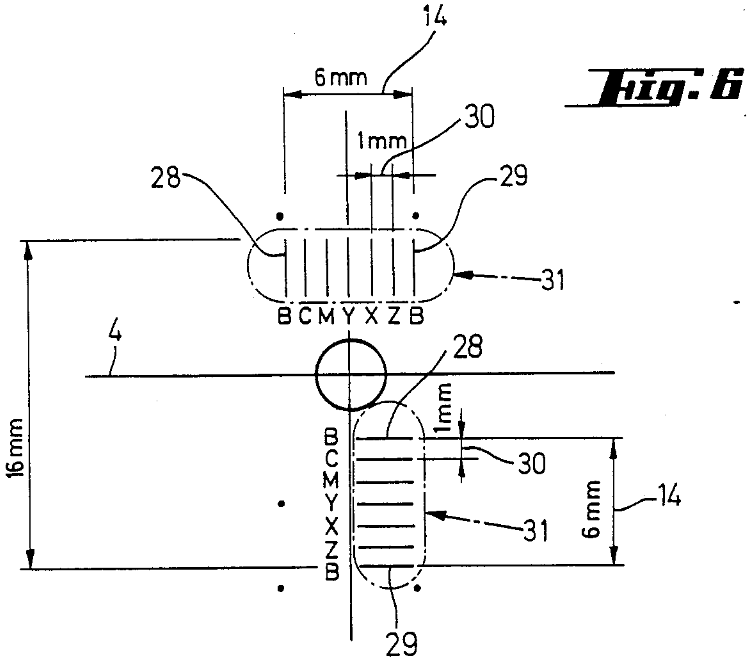
FIG. 6 is a view of a complete register mark.
Figure 7A:
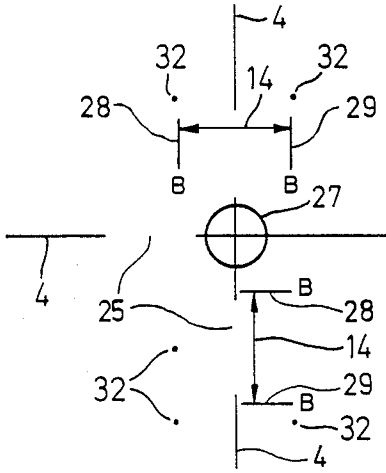
FIGS. 7*a* to 7*f* are diagrammatic representations of the individual separations of the register mark as they exist on the respective color separations.
Figure 7B:
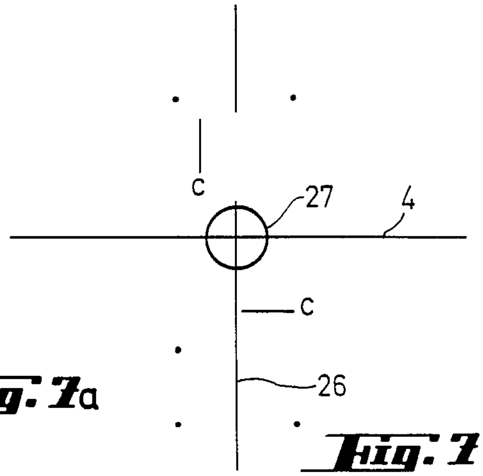
Figure 7C:
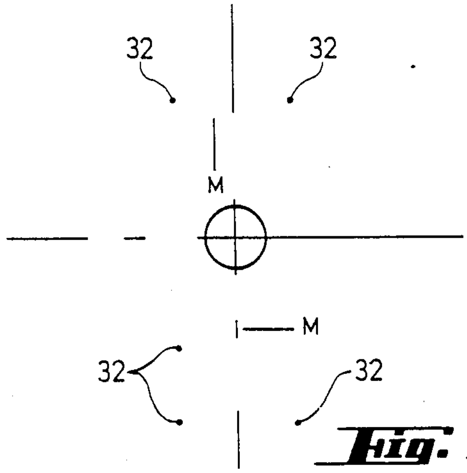
Figure 7D:
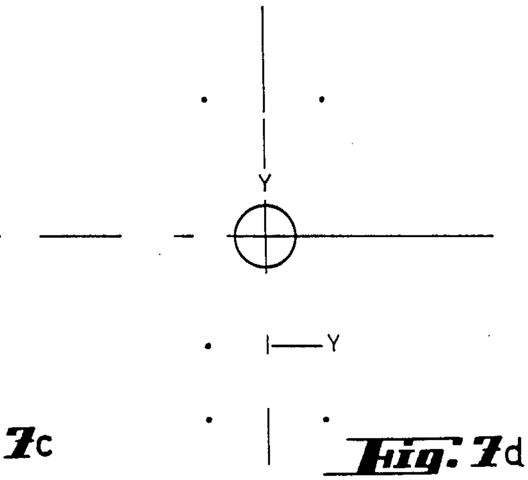
Figure 7E:
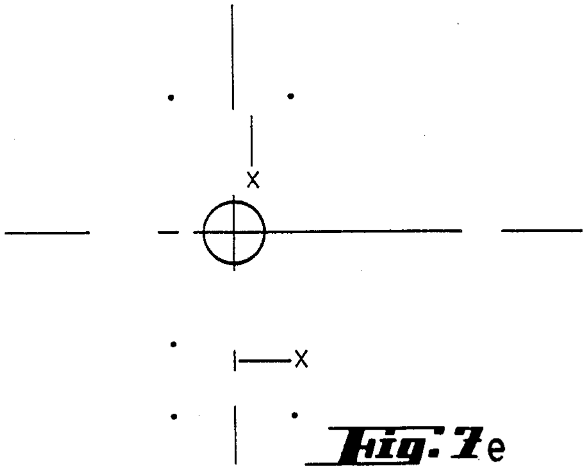
Figure 7F:
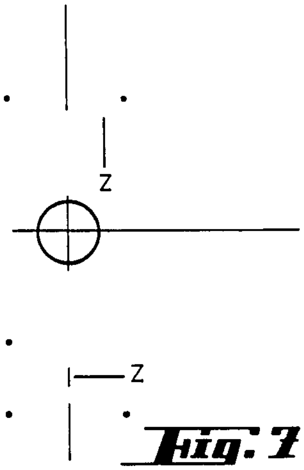

The register mark shown in FIG. 6 represents a complete register mark 3. The mark is made up of two groups of sequences of lines 31 (one each of circumferential register and side register), the individual lines of the sequences of lines 31 being so arranged that, when the colors are printed together, each line is in a different position. Ideally, i.e. if there is no register error, there results a register mark 3 as in FIG. 6. In this connection, the basic distance or spacing between the two lines 28 and 29 is, for example, 6 mm, and the distance or spacing 30 between the lines 28 of the different colors is, for example, 1 mm. Thus, in this case, the register error in each color and in each direction may be a maximum of ±0.5 mm. Up to six colors are possible in the illustrated embodiment.

The provision of a line representing each color separation permits the use of register-cross readers without automatic color recognition, which represents a further essential advantage of the invention.

FIGS. *7a* to *7f* show the parts (lines) of the register mark provided on the individual color separations with regard to their position. In this connection, each color separation thus has a register cross 4, which can be assessed by visual examination with regard to register accuracy. Furthermore, the register cross 4 may be used for the alignment of the automatic register-cross reader. To enhance the information value, it is possible, according to an embodiment of the invention, for the intersecting straight lines to have different gaps or interruptions 25 representing the individual color separation. This advantageously provided a simpler assignment to the respective color separation with respect to the assessment.

In each color separation, moreover, there is the same circle 27 with its center point lying on the point of intersection of the register cross 4, the circle 27 serving for the simple visual assessment of the direction and estimated order of magnitude of the register error.

Each color separation contains two lines, respectively, which are generally disposed perpendicularly to one another and, in one of the color separations (e.g. register cross B), additionally in each of the directions, a further line lying parallel to the other line at a defined distance 14 (e.g. 6 mm). This defined distance 14 is measured by the register-cross reader and is used to obtain the image scale of the measuring optics and to employ it as a basis for evaluation. This inclusion of the image scale makes it possible also to use measured values from a register-reading device that has been placed in position at a slant or skewed with respect to the register marks, without any resultant measuring error.

Figure 8:
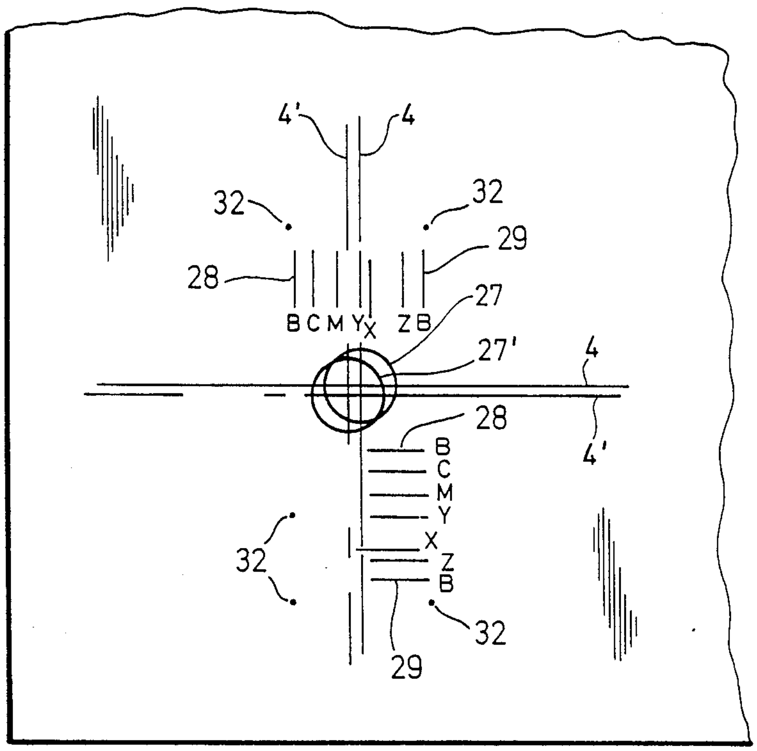
FIG. 8 is a view similar to that of FIG. 1 but showing a register error with respect to color separation X.

FIG. 8 shows a register mark 3 in which only the color X has a register error.

Five small dots 32 serve, on the one hand, as a minimum limit for the cutting of the films of the various color separations and, on the other hand, for checking the correct side positioning of the marks in the case of individual or separate mounting of the color separations.

Figures 9, 9A, 9B, 9C, 9D:
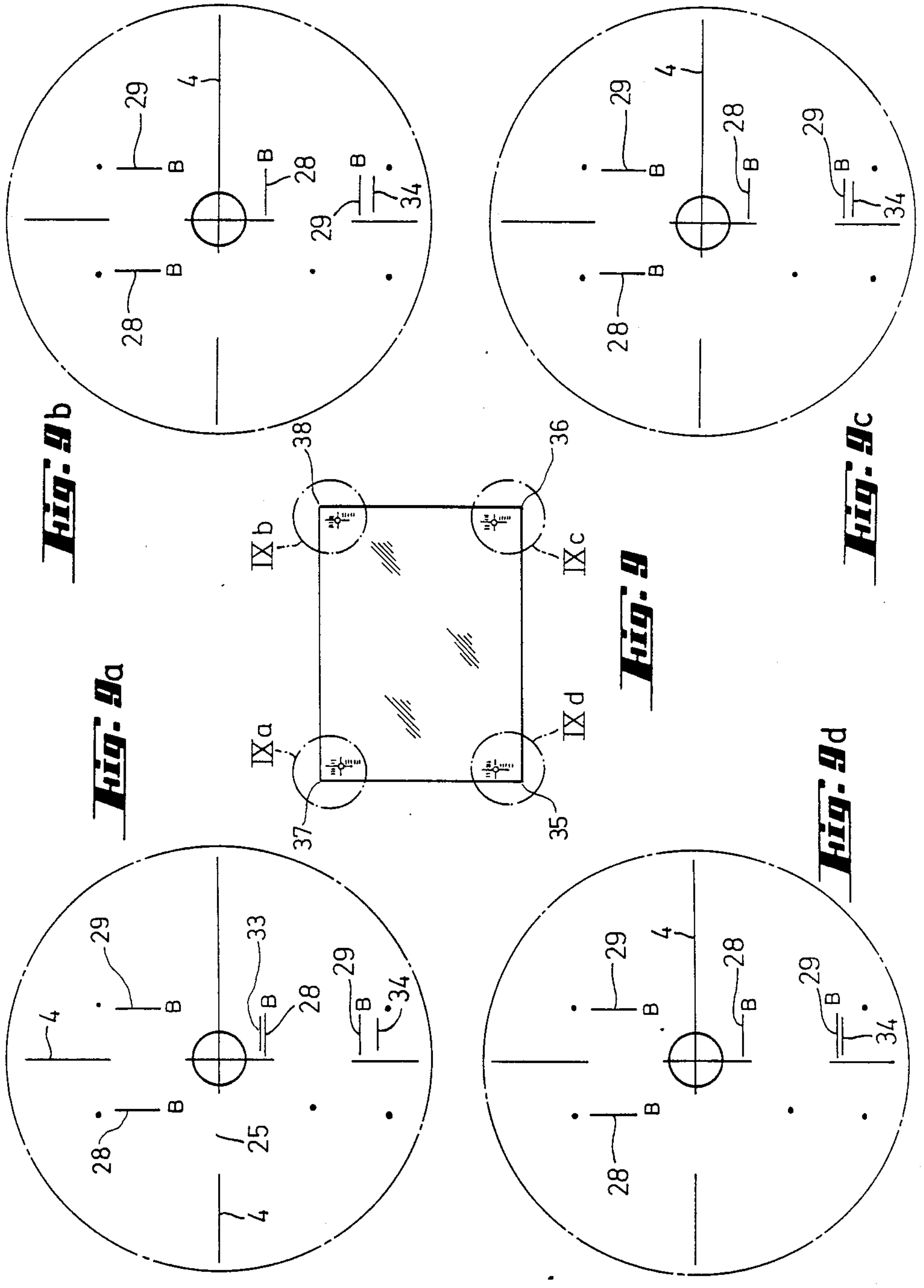
FIG. 9 is a plan view of a printing plate showing register marks with additional coding.
FIGS. 9*a* to 9*d* are enlarged fragmentary views, respectively, of FIG. 9 with possible arrangements of the respective register marks on a printed sheet.

FIGS. 9 and *9a* to *9d* show an example of how a register mark can be provided with an additional code 33 for first form and perfector printing and for the position 34 on the sheets. This is done preferably in the color containing two lines 28 and 29 in each direction, because this register mark 3, which serves as a reference, is present in every case. In an advantageous manner, this marking does not take up any additional space transversely to the running or travel direction and can be read simultaneously with the measuring of the mark.

The foregoing is a description corresponding in substance to German Application P 37 19 766.5, dated June 13, 1987, the International priority of which is being claimed for the instant application, and which is hereby made part of this application. Any material discrepancies between the foregoing specification and the aforementioned corresponding German application are to be resolved in favor of the latter.

I claim:

1. Device for determining a register error in the case of a multi-color print made with a printing press, comprising a hand-held housing containing:
   - (a) a sight formed in a bottom surface of said housing;
   - (b) an optical system disposed at a distance from said sight and having an optical axis directed towards said sight;
   - (c) a mirror disposed between said optical system and said sight for deflecting light reflected from said sight;
   - (d) a light-receiving unit disposed so as to be irradiated with the light deflected by said mirror; and
   - (e) an evaluation unit connected to said light-receiving unit for evaluating information from the light received by said light-receiving unit.

2. Device according to claim 1, wherein a device for screening out incident unwanted light is provided between said optical system and said mirror.

3. Device according to claim 1, including another optical system disposed in an optical path of the light between said mirror and said light-receiving unit.

4. Device according to claim 3, wherein said other optical system comprises a magnifier, and including a filter disposed in said optical path of the light between said mirror and said magnifier.

5. Device according to claim 1, wherein said sight has a basic geometry, corresponding approximately to geometrical dimensions of a register mark and is formed with further slit-shaped recesses along respective straight lines of the register cross, said sight being formed with a bevel at one edge thereof.

6. Device according to claim 1, wherein said light-receiving unit comprises two rows of diodes positioned transversely to one another, relative positions of said rows of diodes corresponding to relative positions of information carriers contained on a register mark.

7. Device according to claim 6, including cylindrical lenses disposed in front of said rows of diodes.

8. Device according to claim 1, including illuminating means disposed above said sight for illuminating said sight.

9. Device according to claim 1, including a keyboard for supplying information other than from the light to said evaluation unit.

10. Device according to claim 1, including a photodiode in said housing for measuring the light reflected from the register mark and from the paper within said sight.

11. Device according to claim 1, including cylindrical lenses disposed in front of said light-receiving unit.

12. Device according to claim 1, including a glass filter disc disposed between said sight and said mirror.

13. Device according to claim 1, wherein said light-receiving unit comprises two rows of diodes disposed transversely to one another and being rotatable relative to the angular alignment thereof.

14. Device according to claim 1, including means for determining and displaying an optimum datum color.

15. Register mark for automatically measuring and visually assessing register errors in products formed by printing presses, comprising:
   - (a) a register cross formed of two intersecting vertical and horizontal straight lines extending at right angles to one another;
   - (b) a circle having a center point at a point of intersection of said straight lines of said register cross;
   - (c) a first sequence of lines extending parallel to the vertical straight lines of said register cross, the lines of said first sequence of lines being perpendicular to said vertical straight line, and a second sequence of lines extending parallel to the horizontal straight line of said register cross, the lines of said second sequence of lines being perpendicular to said horizontal straight line, one line of the perspective first and second sequence of lines being a reference line from which the other lines of said first and second sequence of lines, respectively, are at a determinable distance, said other lines of said first and second sequence of lines, respectively, representing a given color separation.

16. Register mark according to claim 15, wherein each color separation is provided with a register cross, the straight lines of said register cross being formed with interruptions differing from that for every other color separation.

17. Register mark according to claim 15, wherein each color separation has a line belonging to said first and second sequence of lines, respectively, and being at a distance from said reference line differing from the distance therefrom of the lines of the other color separations.

18. Register mark according to claim 15, wherein the distance between the lines of the respective first and second sequence of lines is greater than twice that of a maximum anticipated register error.

19. Method of recognizing a first form and perfector side of a sheet when measuring a register error with a register-error measuring device, which comprises providing a register mark containing a code for first form or perfector sides, reading the code with the device and simultaneously interpreting the code automatically.

20. Method according to claim 19, which comprises inputting a command for the first form or perfector sides prior to performing the measurement.

21. Method according to claim 19, which comprises basically setting the device for first form or perfector printing, and inputting a command, if necessary, for changing the basic setting for a following measurement.

22. Method according to claim 19, which comprises, prior to a printing job, inputting a command for informing the device of the colors occurring on either the first form and perfector sides.

23. Method according to claim 19, which comprises providing each register mark with an item of information (code) by means of which the position of the register mark is identifiable.

* * * * *